US012581444B2

(12) United States Patent
Sun et al.

(10) Patent No.: US 12,581,444 B2
(45) Date of Patent: Mar. 17, 2026

(54) BEACON RECEPTION IMPROVEMENT

(71) Applicant: Beken Corporation, Shanghai (CN)

(72) Inventors: Qiang Sun, Shanghai (CN); Yin Wang, Shanghai (CN); Huaming Jiang, Shanghai (CN); Yantao Li, Shanghai (CN)

(73) Assignee: Beken Corporation, Shanghai (CN)

( * ) Notice: Subject to any disclaimer, the term of this patent is extended or adjusted under 35 U.S.C. 154(b) by 274 days.

(21) Appl. No.: 18/499,041

(22) Filed: Oct. 31, 2023

(65) Prior Publication Data

US 2025/0119857 A1 Apr. 10, 2025

(30) Foreign Application Priority Data

Oct. 9, 2023 (CN) .......................... 202311305903.6

(51) Int. Cl.
*H04W 56/00* (2009.01)
*H04L 1/1607* (2023.01)
*H04W 48/10* (2009.01)

(52) U.S. Cl.
CPC ......... *H04W 56/005* (2013.01); *H04L 1/1614* (2013.01); *H04W 48/10* (2013.01)

(58) Field of Classification Search
None
See application file for complete search history.

(56) References Cited

U.S. PATENT DOCUMENTS

| | | | | |
|---|---|---|---|---|
| 2015/0110231 A1* | 4/2015 | Alexander | .......... | H04L 27/2675 |
| | | | | 375/362 |
| 2016/0315696 A1* | 10/2016 | Lee | ...................... | H04B 10/032 |
| 2016/0345277 A1* | 11/2016 | Segev | ................. | H04W 56/001 |
| 2017/0251425 A1* | 8/2017 | Khoryaev | ............. | H04W 8/005 |
| 2017/0272117 A1* | 9/2017 | Fujimura | ............. | H04B 1/7087 |
| 2019/0246368 A1* | 8/2019 | Stager | ............... | H04W 56/0015 |
| 2022/0353117 A1* | 11/2022 | Song | ........................ | H04L 27/06 |
| 2023/0217311 A1* | 7/2023 | Farhoodi | ............... | H04W 28/14 |
| | | | | 370/328 |
| 2023/0319557 A1* | 10/2023 | Liu | ...................... | H04W 12/037 |
| | | | | 455/410 |
| 2025/0132787 A1* | 4/2025 | Ding | ........................ | G01S 13/58 |

\* cited by examiner

*Primary Examiner* — Phirin Sam
(74) *Attorney, Agent, or Firm* — Schwegman Lundberg & Woessner, P.A.

(57) ABSTRACT

The present disclosure address systems and methods for improving the performance of Interest of Things (IoT) devices in receiving Beacon signals. The method includes receiving a first signal from an access point (AP) of a network environment, extracting a time synchronization value of the AP from the first signal, obtaining a local time synchronization value corresponding to the time synchronization value of the AP, and determining whether a preset condition is satisfied. The preset condition may indicate that the receiving of the first signal is to be interrupted. The method further includes in response to a determination that the preset condition is satisfied, obtaining a time synchronization offset value, adjusting the local time synchronization value based on the time synchronization offset value and the time synchronization value of the AP, and preparing to receive a second signal according to the adjusted local time synchronization value.

18 Claims, 8 Drawing Sheets

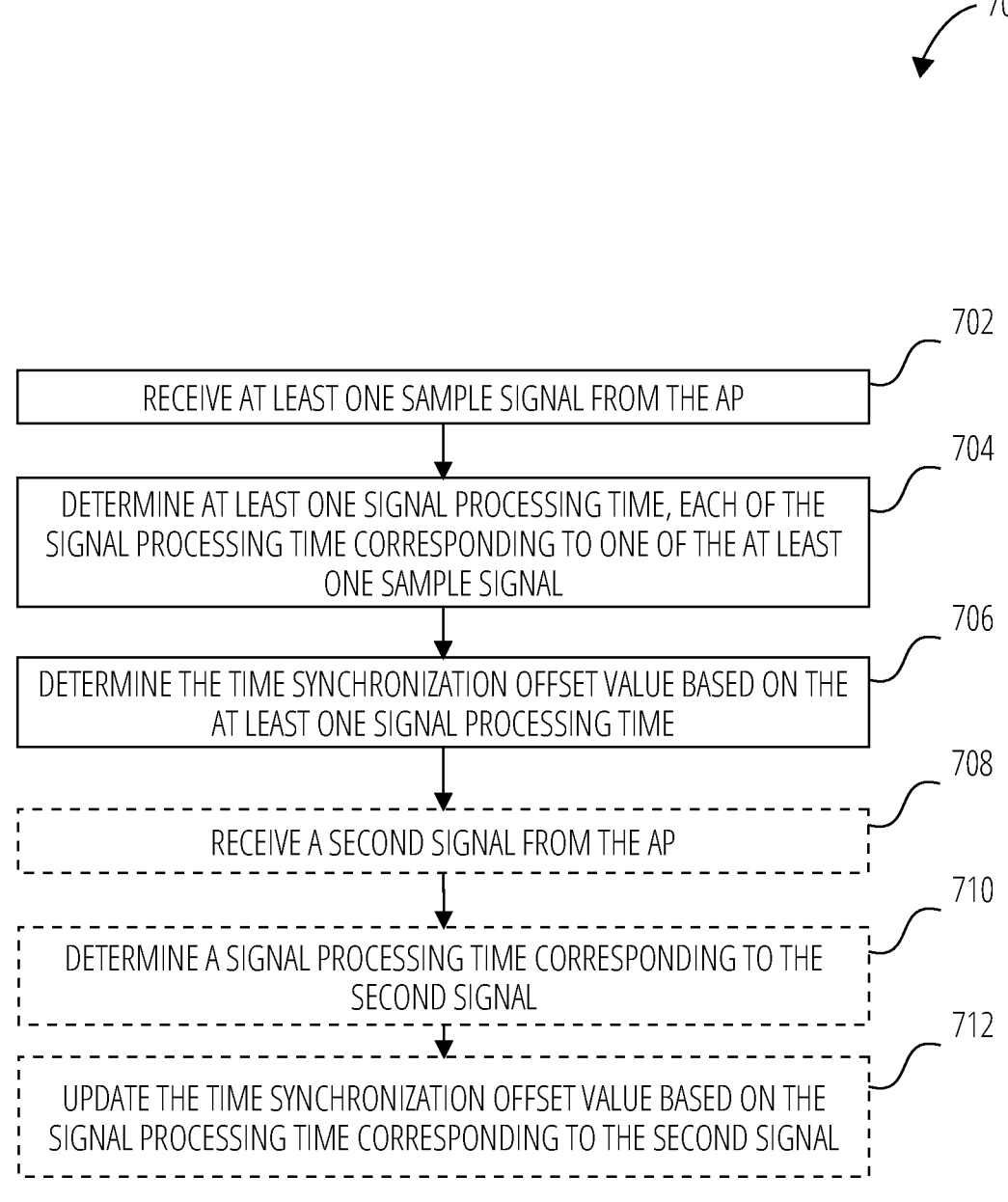

700

702

RECEIVE AT LEAST ONE SAMPLE SIGNAL FROM THE AP

704

DETERMINE AT LEAST ONE SIGNAL PROCESSING TIME, EACH OF THE SIGNAL PROCESSING TIME CORRESPONDING TO ONE OF THE AT LEAST ONE SAMPLE SIGNAL

706

DETERMINE THE TIME SYNCHRONIZATION OFFSET VALUE BASED ON THE AT LEAST ONE SIGNAL PROCESSING TIME

708

RECEIVE A SECOND SIGNAL FROM THE AP

710

DETERMINE A SIGNAL PROCESSING TIME CORRESPONDING TO THE SECOND SIGNAL

712

UPDATE THE TIME SYNCHRONIZATION OFFSET VALUE BASED ON THE SIGNAL PROCESSING TIME CORRESPONDING TO THE SECOND SIGNAL

FIG. 7

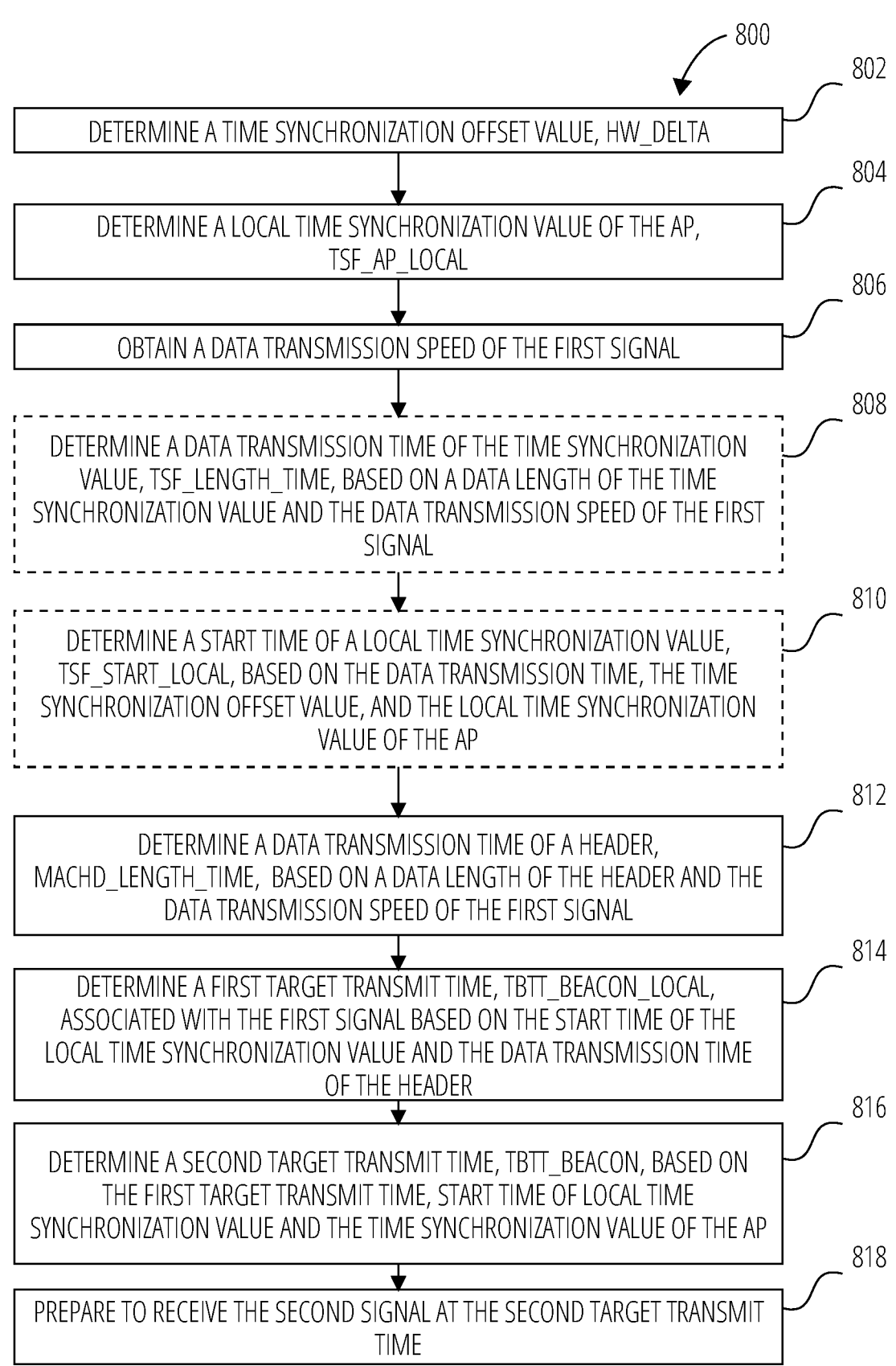

800

802

DETERMINE A TIME SYNCHRONIZATION OFFSET VALUE, HW_DELTA

804

DETERMINE A LOCAL TIME SYNCHRONIZATION VALUE OF THE AP, TSF_AP_LOCAL

806

OBTAIN A DATA TRANSMISSION SPEED OF THE FIRST SIGNAL

808

DETERMINE A DATA TRANSMISSION TIME OF THE TIME SYNCHRONIZATION VALUE, TSF_LENGTH_TIME, BASED ON A DATA LENGTH OF THE TIME SYNCHRONIZATION VALUE AND THE DATA TRANSMISSION SPEED OF THE FIRST SIGNAL

810

DETERMINE A START TIME OF A LOCAL TIME SYNCHRONIZATION VALUE, TSF_START_LOCAL, BASED ON THE DATA TRANSMISSION TIME, THE TIME SYNCHRONIZATION OFFSET VALUE, AND THE LOCAL TIME SYNCHRONIZATION VALUE OF THE AP

812

DETERMINE A DATA TRANSMISSION TIME OF A HEADER, MACHD_LENGTH_TIME, BASED ON A DATA LENGTH OF THE HEADER AND THE DATA TRANSMISSION SPEED OF THE FIRST SIGNAL

814

DETERMINE A FIRST TARGET TRANSMIT TIME, TBTT_BEACON_LOCAL, ASSOCIATED WITH THE FIRST SIGNAL BASED ON THE START TIME OF THE LOCAL TIME SYNCHRONIZATION VALUE AND THE DATA TRANSMISSION TIME OF THE HEADER

816

DETERMINE A SECOND TARGET TRANSMIT TIME, TBTT_BEACON, BASED ON THE FIRST TARGET TRANSMIT TIME, START TIME OF LOCAL TIME SYNCHRONIZATION VALUE AND THE TIME SYNCHRONIZATION VALUE OF THE AP

818

PREPARE TO RECEIVE THE SECOND SIGNAL AT THE SECOND TARGET TRANSMIT TIME

FIG. 8

BEACON RECEPTION IMPROVEMENT

CROSS REFERENCE TO RELATED APPLICATION

This application claims priority to and incorporates by reference Chinese patent application no. 202311305903.6 filed 9 Oct. 2023.

TECHNICAL FIELD

The present disclosure generally relates to signal reception. In particular, example embodiments of the present disclosure address systems and methods for improving the performance of Internet of Things (IoT) devices in receiving Beacon signals.

BACKGROUND

An IoT system includes a network of physical objects (referred to as "smart devices" or "IoT devices") that are embedded with sensors, software, and other technologies for enabling connection and exchange of data with other devices via the Internet. For example, the IoT devices are used in home automation to control lighting, heating and air conditioning, media and security systems, and camera systems.

The IoT device may periodically receive Beacon signals from a beacon device, such as an access point (AP). The Beacon signals carry timing information that assists in maintaining synchronization between the IoT device and the IoT network.

SUMMARY

In one aspect, a method is provided. The method includes receiving a first signal from an access point (AP) of a network environment, extracting a time synchronization value of the AP from the first signal, obtaining a local time synchronization value corresponding to the time synchronization value of the AP, and determining whether a preset condition is satisfied. The time synchronization value of the AP may include a Timing Synchronization Function (TSF) value of the AP. The local time synchronization value may include a TSF value read on a local counter. The preset condition may indicate that the receiving of the first signal is to be interrupted. The method further includes in response to a determination that the preset condition is satisfied, obtaining a time synchronization offset value, adjusting the local time synchronization value based on the time synchronization offset value and the time synchronization value of the AP, and preparing to receive a second signal according to the adjusted local time synchronization value.

In one aspect, an Internet of Things (IoT) device is provided. The IoT device includes a processor. The IoT device also includes a memory storing instructions that, when executed by the processor, configure the IoT device to receive a first signal from an access point (AP) of a network environment, extract a time synchronization value of the AP from the first signal, obtain a local time synchronization value corresponding to the time synchronization value of the AP, and determine whether a preset condition is satisfied. The time synchronization value of the AP may include a Timing Synchronization Function (TSF) value of the AP. The local time synchronization value may include a TSF value read on a local counter. The preset condition indicates that the receiving of the first signal is to be interrupted. In response to a determination that the preset condition is satisfied, the instructions further configure the IoT device to obtain a time synchronization offset value, adjust the local time synchronization value based on the time synchronization offset value and the time synchronization value of the AP, and prepare to receive a second signal according to the adjusted local time synchronization value.

In one aspect, a non-transitory computer-readable storage medium is provided. The computer-readable storage medium includes instructions that when executed by a computer, cause the computer to receive a first signal from an access point (AP) of a network environment, extract a time synchronization value of the AP from the first signal, obtain a local time synchronization value corresponding to the time synchronization value of the AP, determine whether a preset condition is satisfied. The time synchronization value of the AP may include a Timing Synchronization Function (TSF) value of the AP. The local time synchronization value may include a TSF value read on a local counter. The preset condition indicates that the receiving of the first signal is to be interrupted. In response to a determination that the preset condition is satisfied, the instructions further cause the computer to obtain a time synchronization offset value, adjust the local time synchronization value based on the time synchronization offset value and the time synchronization value of the AP, and prepare to receive a second signal according to the adjusted local time synchronization value.

BRIEF DESCRIPTION OF THE DRAWINGS

To easily identify the discussion of any particular element or act, the most significant digit or digits in a reference number refer to the figure number in which that element or act is first introduced.

FIG. 7 is a flowchart illustrating operations of the IoT device in determining a time synchronization offset value, in accordance with some example embodiments.

FIG. 8 is a flowchart illustrating operations of the IoT device in determining a target transmit time, in accordance with some example embodiments.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As mentioned above, an IoT device periodically receives Beacon signals and synchronizes itself with an AP based on time synchronization information contained in the Beacon signals. When an AP sends out a Beacon signal, it may include a current Timing Synchronization Function (TSF) value of the AP in the Beacon signal. This TSF value represents the timestamp of when the Beacon signal was transmitted. The IoT device can then adjust its local TSF value based on the received TSF value in the Beacon signal to be synchronized with the IoT system. If a finish time after completely receiving/processing the Beacon signal is known, the adjustment of the local TSF value can be more accurate because the calculation of the local TSF value inherently incorporates the hardware processing time of the Beacon signal. In contrast, if the Beacon signal is not received/processed completely, the accuracy of the time synchronization decreases drastically because the hardware processing time of the Beacon signal cannot be calculated.

However, there are possible scenarios where the Beacon signal cannot be received completely. For example, the IoT device may actively skip a part of the Beacon signal to reduce its power consumption (e.g., when it determines from a data field in the Beacon signal that there isn't any data packet to be received). As another example, the IoT device may preempt the communication of the current Beacon signal for a coexisting signal of a higher priority.

The present disclosure provides system and methods for predetermining an average hardware processing time at the instances when the whole Beacon signal is processed. The average hardware processing time is then used to calibrate the local TSF value when only part of the Beacon signal is processed. A Target Beacon Transmit Time (TBTT) can also be calculated based on the calibrated local TSF value, and the IoT device can be prepared to receive the next Beacon signal based on the TBTT. The present disclosure potentially has at least the following advantages:

1. By processing only part of the Beacon signal, the power consumption of the IoT device can be reduced.
2. While receiving the Beacon signal, the IoT device can switch to a communication with a higher priority without losing the time synchronization with the AP.

Figure 1:
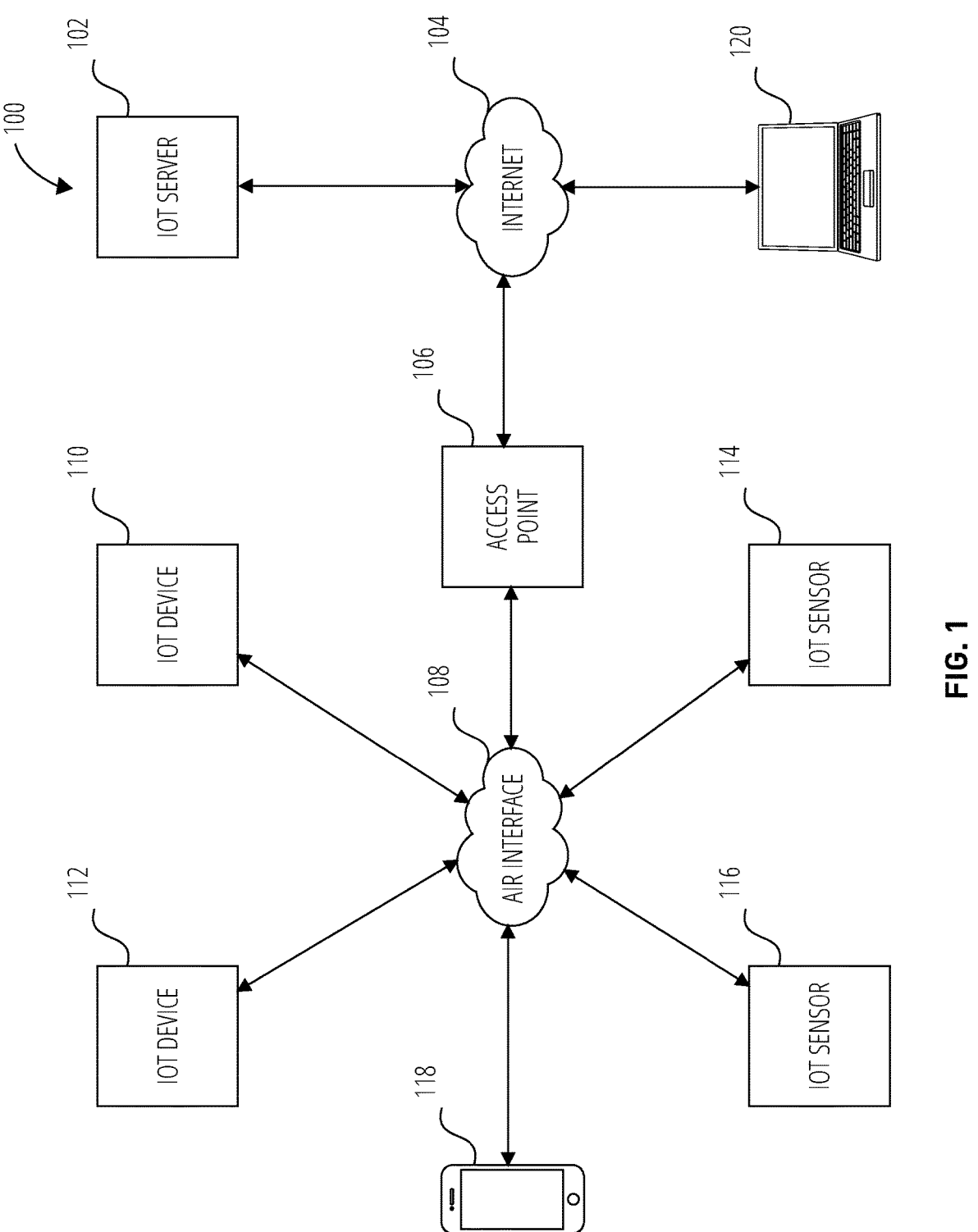
FIG. 1 is a block diagram illustrating an internet of things (IoT) system, in accordance with some example embodiments.

FIG. 1 is a block diagram illustrating an internet of things (IoT) system, in accordance with some example embodiments. The IoT system 100 may include an IoT server 102, a network, such as the Internet 104, an access point 106, an air interface 108, IoT devices 110 and 112, IoT sensors 114 and 116, a mobile device 118, and a monitor device 120.

The IoT server 102 serves as the backbone of the IoT system 100, managing data and coordinating communication among other devices in the IoT system 100. The IoT server 102 collects, processes, and stores data transmitted from IoT devices 110 and 112 and IoT sensors 114 and 116. It also performs tasks such as device management, data analytics, and security enforcement, ensuring smooth operation, and valuable insights from collected data. For example, the IoT server 102 may receive an instruction from the monitor device 120 via the Internet 104 and follow the instruction to manage the IoT device 110 to perform a specific task.

The Internet 104 is a network that allows devices in the IoT system 100 to communicate and exchange data. The Internet 104 provides a pathway for data to travel from IoT devices 110 and 112 and IoT sensors 114 and 116 to the IoT server 102, and vice versa. The Internet 104 also enables remote management, data analysis, and over-the-air updates to the IoT devices. It should be noted that the internet 104 may be combined with or replaced with other type(s) of network.

The access point 106 serves as a bridge between devices (e.g., IoT devices 110 and 112 and IoT sensors 114 and 116) and the Internet 104. It enables devices to connect to the Internet 104 wirelessly, through e.g., Wi-Fi, and facilitates data transfer between these devices and the IoT server 102.

The air interface 108 refers to the radio frequency spectrum used for wireless communication between the access point 106 and the IoT devices 110 and 112 and IoT sensors 114 and 116. It consists of the standards, protocols, and technologies that define how data is formatted and transmitted wirelessly. For example, the air interface 108 may employ a Wi-Fi network under an IEEE 802.11 standard. Alternatively, or additionally, the air interface 108 may employ a Bluetooth, a ZigBee, a Z-Wave, a LPWAN, a RFID, a NFC, etc.

The IoT devices 110 and 112 are physical devices, such as appliances, machines, or gadgets, that are equipped with the necessary hardware and software to perform specific tasks. They interact with the IoT sensors 114 and 116 and communicate with the IoT server 102 through the access point 106 and the Internet 104.

The IoT sensors 114 and 116 are devices or modules that detect changes in the environment or system and convert these changes into data that can be understood and used by the IoT devices 110 and 112 or the IoT server 102. These sensors can monitor various parameters, like temperature, humidity, pressure, light, motion, or other environmental factors.

The mobile device 118 is a portable device, such as a smartphone or tablet, that can interact with the IoT system. It can be used to monitor, control, or configure the IoT devices 110 and 112 remotely. It communicates with the IoT server 102 over the Internet 104, allowing users to interact with the IoT system 100 from anywhere.

The monitor device 120 is a device specifically designed to observe and display information from the IoT system. This could be a dedicated display showing data collected by the IoT sensors 114 and 116, or it could be a computer used by system administrators to manage the IoT system 100. It provides real-time or historical data visualization, allowing for effective system monitoring and troubleshooting.

In some embodiments, the access point 106 may periodically broadcast a Beacon signal. The Beacon signal can be received by devices in the IoT system 100, such as the IoT devices 110 and 112, the IoT sensors 114 and 116, and/or the mobile device 118. The Beacon signal carries time synchronization information that allows the IoT devices 110 and 112 to align their internal clocks with the access point 106. This synchronization ensures that all devices in the network use the same time reference, thereby improving coordination and efficient communication. The Beacon signal also serves as a presence indicator, allowing IoT devices 110 and 112 to know that the access point 106 is within range and operational. Furthermore, it provides necessary network-related information, such as the Service Set Identifier (SSID), supported data rates, and other parameters necessary for the IoT devices to connect and communicate effectively with the network.

In an energy-constrained environments and/or when IoT devices 110 and 112 operate on batteries, the use of Beacon signals for time synchronization can also help reduce power consumption. For example, IoT devices 110 and 112 can enter a power-saving mode when not transmitting or receiving data, and wake up in synchronization with the Beacon signal (e.g., at scheduled Target Beacon Transmission Time (TBTT)). Details regarding the data stored in a Beacon signal can be found in FIG. 3 and the corresponding descriptions.

It should be noted the present disclosure is not limited to an IoT system with a Wi-Fi network under IEEE 802.11 standard. Instead, the present disclosure may be used in any other same or different types of systems with same or different types of network environment. Such application is within the protective scope of the present disclosure.

Figure 2:
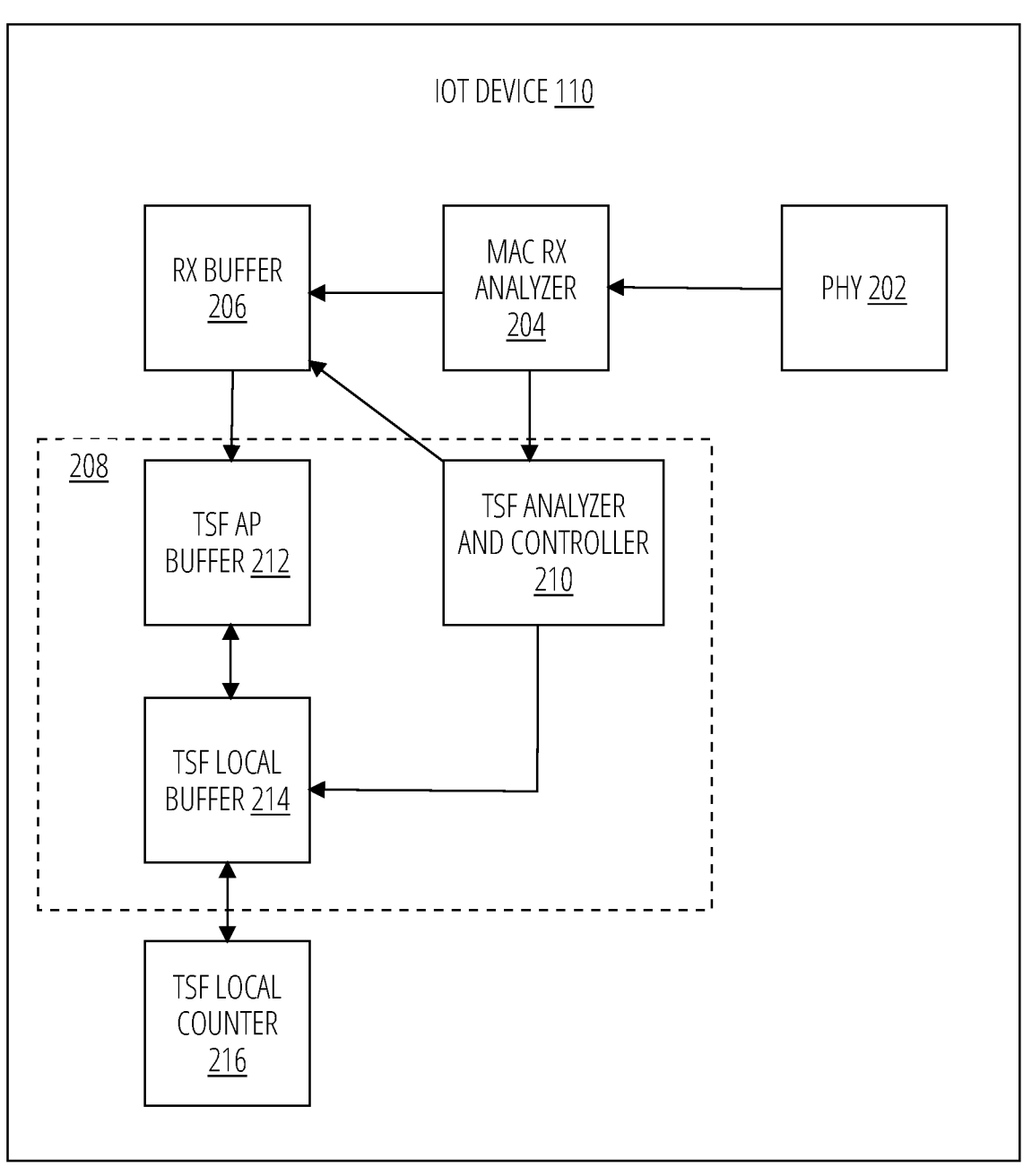
FIG. 2 is a block diagram illustrating an internet of things (IoT) device, in accordance with some example embodiments.

FIG. 2 is a block diagram illustrating an internet of things (IoT) device, in accordance with some example embodiments. The IoT device 110 (or the IoT device 112) may include a physical layer (PHY) 202, a media access control (MAC) receive (RX) analyzer 204, a RX buffer 206, a timing synchronization function (TSF) hardware (HW) analyzer module 208, and a TSF local counter 216. The TSF HW analyzer module 208 may further include a TSF analyzer and controller 210, a TSF access point (AP) buffer 212, a TSF local buffer 214.

The PHY 202 is the first and most fundamental layer for networking, responsible for the actual transmission and reception of data over a network medium (e.g., the air interface 108). The PHY 202 transmits data from the IoT device 110 to the network medium and receives data from the network medium to the IoT device 110. In transmission, the PHY 202 converts digital data into signals (electrical, optical, or radio). In reception, the PHY 202 converts these signals back into digital data. The PHY 202 also establishes bit synchronization, which ensures that the sender and receiver are aligned in their interpretation of when one bit ends and another begins.

The MAC RX analyzer 204 is used to analyze the MAC header (e.g., MAC header 302) of signals received. Taking a Beacon signal as an example, the first 24 or 28 bytes (192 or 224 bits) of the Beacon signal correspond to a MAC header, the following 8 bytes (64 bits) after the MAC header corresponding to a TSF value. When the MAC RX analyzer 204 identifies that the signal received is a Beacon signal (e.g., by checking the frame control field of the MAC header), it begins to write the part which corresponds to the TSF value of the AP onto the RX buffer 206 (e.g., either from the $25^{th}$ byte to the $32^{nd}$ byte, or from the $29^{th}$ byte to the $36^{th}$ byte, depending on the length of the MAC header). Details regarding the data stored in the Beacon signal can be found in FIG. 3 and the descriptions thereof. When the MAC RX analyzer 204 finishes writing the TSF value onto the RX buffer 206, the MAC RX analyzer 204 may transmit a control signal to the TSF analyzer and controller 210 of the TSF HW analyzer module 208.

After receiving the control signal (which indicates that the TSF value have been received and written onto the RX buffer 206 completely), the TSF analyzer and controller 210 may read the value stored in the RX buffer 206 and write it on the TSF AP buffer 212. The TSF analyzer and controller 210 may also read the counting on the TSF local counter 216 and write it on the TSF local buffer 214. Specifically, the value stored in the TSF AP buffer 212 corresponds to a TSF value of the AP (e.g., access point 106) when it sends out the Beacon signal. The value stored in the TSF local buffer 214 corresponds to a TSF value of the IoT device 110 after it processes the TSF value of the AP. The difference between the values stored in the TSF AP buffer 212 and TSF local buffer 214 may be calculated and used to correct the TSF value of the IoT device 110 or to estimate a Target Beacon Transmit Time (TBTT). A hardware processing time may be used to further calibrate the TSF value or the TBTT. Details regarding the calculation of the hardware processing time may be found in FIG. 7 and the descriptions thereof. In a variation of the above method, the TSF analyzer and controller 210 may read the counting on the TSF local counter 216 immediately before the MAC RX analyzer 204 begins reading the TSF value of the Beacon signal. Unlike the above method, the counting read in this variation method corresponds to a TSF value of the IoT device 110 before it processes the TSF value of the AP. Compared with the above method, the variation generates two interrupts: one before the TSF is read and one after the TSF is read while the above method generates only one interrupt. However, the start time of the TSF value (e.g., TSF_START_LOCAL, described in FIGS. 5 and 8) in the variation can be calculated more directly than the above method. Both methods are protected within the scope of the present disclosure.

Figure 3:
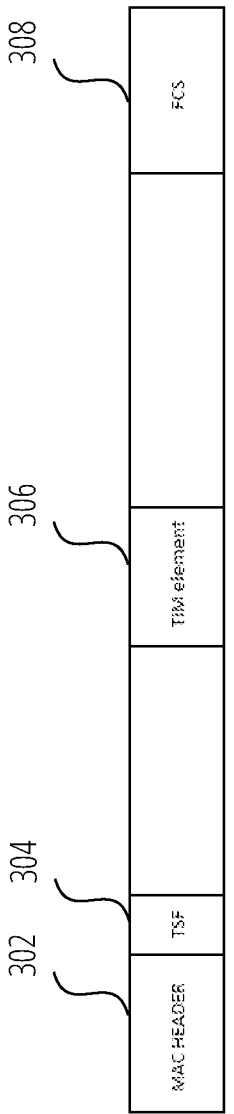
FIG. 3 is a schematic diagram illustrating data stored in a Beacon signal, in accordance with some example embodiments.

FIG. 3 is a schematic diagram illustrating data stored in a Beacon signal, in accordance with some example embodiments. As shown in FIG. 3, a Beacon signal may include a MAC header 302, a TSF 304, a traffic indication map (TIM) element 306, a frame check sequence (FCS) 308, and other parts not labelled in the figure.

The MAC header 302 may include a 2-byte frame control field, a 2-byte duration/ID field, three 6-byte address fields, and a 2-byte sequence control field. Optionally, the MAC header 302 may include a 4-byte high throughput (HT) control field. Depending on whether the HT control field exists, the MAC header 302 may be 24 bytes or 28 bytes long.

The TSF 304 is an 8-byte field that represents the number of microseconds that have passed since the access point (e.g., access point 106) started running. This field correspond to the value of the access point's TSF timer at the time the first bit of the Beacon signal was transmitted.

The TIM element 306 may include an Element ID field, a length field, a Delivery Traffic Indication Message (DTIM) count field, a DTIM period field, a Bitmap Control field, and a Partial Virtual Bitmap field. The Bitmap control field is 1 byte (8 bits) long. The first bit of the Bitmap control field is a Traffic buffer map (TBM) bit that indicates whether there is a broadcast data packet or a multicast data packet buffered at the access point. If the TBM bit is set to 1, it is indicated that the AP has buffered a broadcast data packet or a multicast data packet. If a bit is set to 0, it is indicated that there is no broadcast data packet or multicast data packet buffered at the AP. The next 7 bits of the Bitmap Control field indicates the Partial Virtual Bitmap's starting offset. These 7 bits inform the station about the start position in the Partial Virtual Bitmap to look for the status of the AP. Accordingly, when a station (e.g., IoT devices 110 and 112, IoT sensors 114 and 116) receives a Beacon signal, it may check the TBM bit in the bitmap control field of the received Beacon signal. If the bit is 1, the station understands that the AP may have buffered broadcast or multicast data packet and stays awake to receive it. If the bit is 0, the station may further check the Partial Virtual Bitmap after offsetting it by the values of the remaining 7 bits of the Bitmap Control field. It should be noted that the term data packet refers to the unicast data packet, the broadcast data packet, or the multicast data packet in the present disclosure. Alternatively, the data packet refers to unicast data packet only and the broadcast data packet and multicast data packet are called broadcast packet and multicast packet, respectively.

In some examples, each station is assigned an Association ID (AID) by the access point. The Partial Virtual Bitmap field may be a sequence of bits that represent whether associated stations have data buffered at the access point. Specifically, each bit in the Partial Virtual Bitmap field corresponds to an AID of an associated station. If a bit is set to 1, it is indicated that the AP has buffered unicast data packet for the station with the corresponding AID. If a bit is set to 0, it is indicated that there is no unicast data packet buffered at the AP for that station. Accordingly, when a station receives a Beacon signal and detects that the TBM bit in the bitmap control field of the received Beacon signal is 0, it may further check the Partial Virtual bitmap field of the received Beacon signal to see whether the data packet is buffered for the station or for others. If the bit in the partial virtual bitmap field corresponding to the station's AID is 1, the station understands that it has data waiting at the AP and stays awake to receive it. If the bit is 0, the station may return to the power-saving mode.

The FCS 308 is a 4-byte field at the end of the frame. It is calculated based on all the other bits in the frame (including the MAC header and the body, but not including the physical layer preamble and header). When a device transmits a frame, it calculates the FCS and includes it in the frame. When a receiving device gets the frame, it performs the same calculation on the received bits and compares the result to the received FCS. If the two values match, the receiver assumes that the frame was transmitted correctly. If they don't match, the receiver assumes that an error occurred during transmission and discards the frame.

Figures 4A, 4B, 4C:
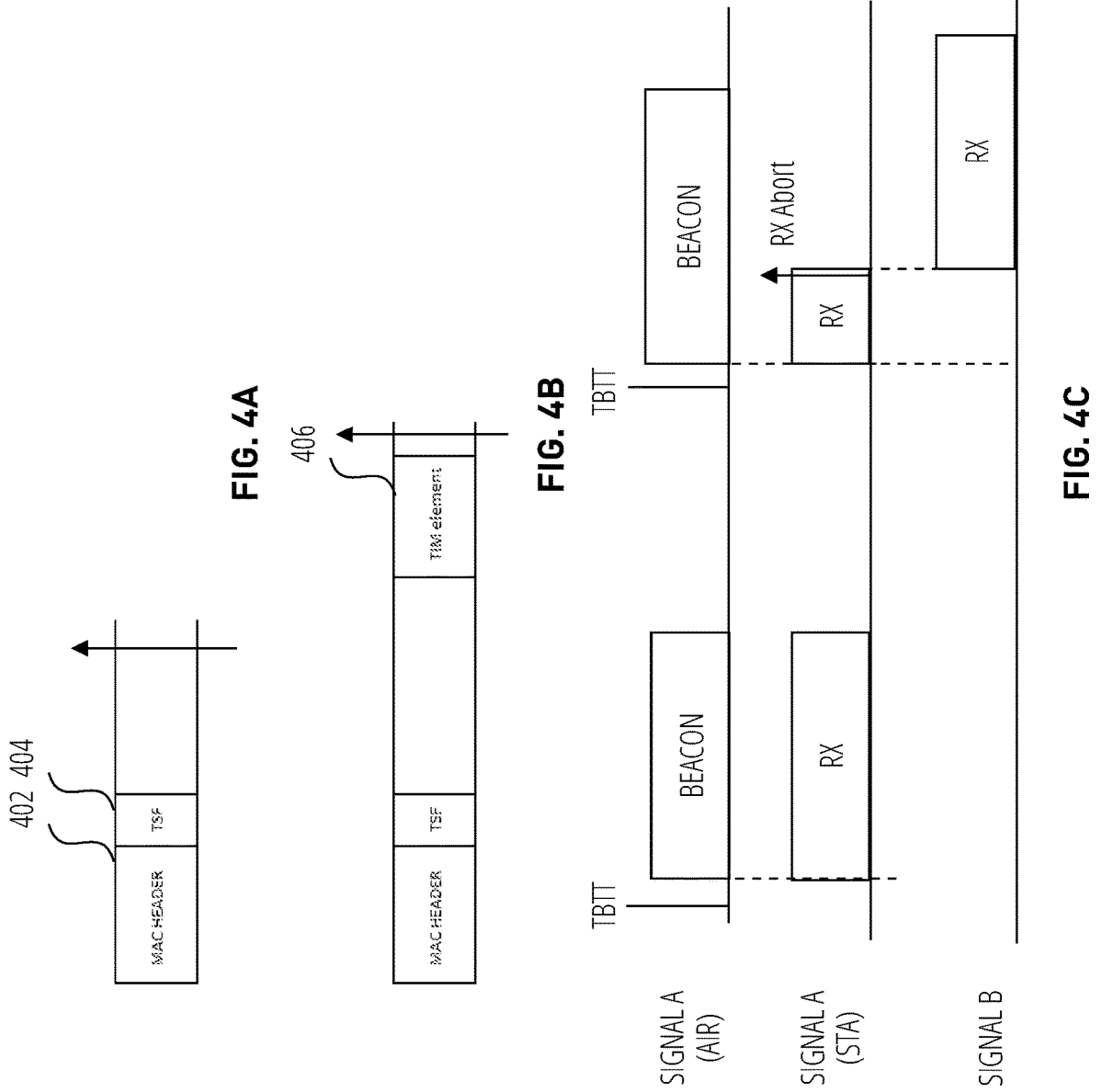
FIGS. 4A-4C are schematic diagrams illustrating data received from the Beacon signal when the receiving of the Beacon signal is interrupted, in accordance with some example embodiments.

FIGS. 4A-4C are a schematic diagrams illustrating data received from the beacon signal when the receiving of the Beacon signal is interrupted, in accordance with some example embodiments. The interruption occurred while receiving the Beacon signal, which causes the Beacon signal not to be received completely, is also referred to as "RX Abort" in the present disclosure.

As shown in FIG. 4A, the MAC header 402 and TSF 404 may correspond to the MAC header 302 and TSF 304, respectively. The RX Abort can occur at any time during the receiving of the Beacon signal. The present disclosure may be applicable to maintain an accurate time synchronization between the station and AP after an RX Abort occurs, as long as the MAC header 402 and the TSF 404 have been received/processed completely. FIG. 4B and FIG. 4C are two example scenarios where the RX Abort occurs but they are not limiting. Instead, the present disclosure can also be used in other scenarios.

Refer to FIG. 4B, the TIM element 406 may, similar to TIM element 306, includes bitmap control field and a Partial Virtual Bitmap field. In some examples, the station (e.g., IoT devices 110 and 112, IoT sensors 114 and 116) may determine that both the TBM bit of the bitmap control field and the bit of the partial virtual bitmap corresponding to its AID is 0. In other words, the station may determine that there is no data packet buffered at the AP or the data packet buffered at AP is not for itself. Then the station may generate an interruption to stop receiving or processing the remaining parts of the Beacon signal in order to reduce its power consumption. For example, parts of the Beacon signal after the TIM element 406, including FCS, are not received and processed.

Refer to FIG. 4C, a Beacon signal A is broadcasted over an air interface. When there is no coexisting signal B, the station receives the Beacon signal A completely. When there is a coexisting signal B with a higher priority degree than the Beacon signal A, RX Abort occurs. Specifically, the station preempts the communication of the signal A for signal B. To be clear, the priority degree used herein refers to a receiving priority related to the types of connections (also referred to as the connectivity types). However, it shall not be limiting.

For devices that support WiFi, Bluetooth, and/or Cellular connections, RX Abort may occur when two or more of these connections have a time conflict and they use or request to use bands at close frequencies. For example, signal B is related to a Bluetooth connection and signal A is related to a WiFi connection. Both Bluetooth and WiFi connections use a 2.4 GHz band. Bluetooth connection has prescheduled time sequences and WiFi connection has prescheduled TBTTs. When there is a time conflict, an arbitration mechanism may be triggered to decide, based on the priority degrees of the signals, which signal is to be received. If the station chooses to receive the Bluetooth signal (signal B), it receives it according to the prescheduled time sequences, which may interrupt the reception of signal A. Similarly, the RX Abort may occur in scenarios when a WiFi connection and a Cellular connection coexist and have a time conflict. For example, the frequency ranges of bands 40 and 41 of 4G Long-Term Evolution (LTE) and bands N40 and N41 of 5G New Radio (NR) are around 2.4 GHz (the frequency of band that the WiFi connection may use). When the Cellular connection has a time conflict with the WiFi connection, they may interfere with the WiFi connection and a similar RX Abort may occur.

Figure 5:
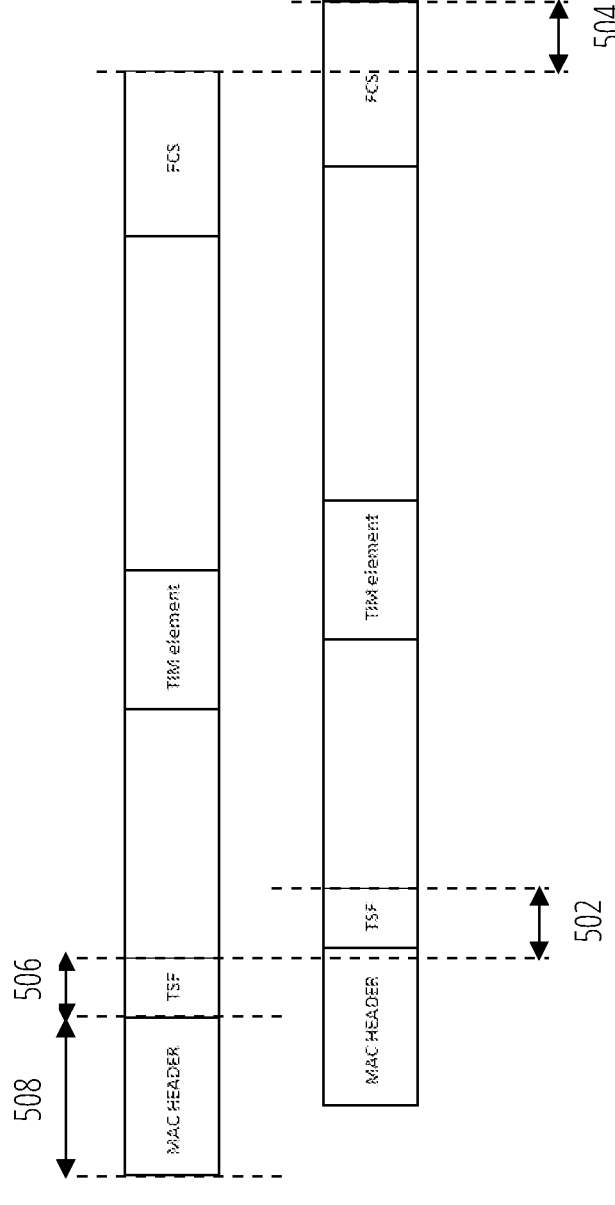
FIG. 5 is a schematic diagram illustrating a comparison between a Beacon signal upon transmission and after fully processed, in accordance with some example embodiments.

FIG. 5 is a schematic diagram illustrating a comparison between a Beacon signal upon transmission and after fully processed, in accordance with some example embodiments. As shown in FIG. 5, the Beacon signal is shifted as a whole by a hardware processing time (including hardware receiving time, computation time, decoding time, etc.). It may be assumed that the TSF offset value 502 is equal to the FCS offset value 504. In some examples, before reading the first bit or after reading the last bit of the TSF in the Beacon signal, the local TSF value ("TSF_AP_LOCAL") of the station (e.g., IoT devices 110 and 112, IoT sensors 114 and 116) may be read from a TSF local counter (e.g., TSF local counter 216) and written on a TSF local buffer (e.g., TSF local buffer 214). The TSF in the Beacon signal ("TSF_AP") may be written on a TSF AP buffer (e.g., TSF AP buffer 212). The TSF local buffer and the TSF AP buffer typically exist as registers, but this shall not be limiting. The TSF offset value 502 ("HW_DELTA," also referred to as a hardware processing time) may be predetermined based on fully processed sample Beacon signals. Details regarding the determination of the TSF offset value 502 may be found in FIG. 7 and the descriptions thereof. A start time of the local TSF value ("TSF_START_LOCAL") can be calculated as:

$$\text{TSF\_START\_LOCAL} = \tag{1}$$
$$\text{TSF\_AP\_LOCAL} - \text{HW\_DELTA} - \text{TSF\_LENGTH\_TIME}$$

where TSF_LENGTH_TIME equals the length of TSF 506 divided by Beacon transmission rate. For example, the Beacon transmission rate is 1 Mbps and the length of TSF 506 is 8 bytes. The TSF_LENGTH_TIME is 64 μs (8*8/1,000,000). In cases where the local TSF value is read immediately before processing the TSF in the Beacon signal, the TSF_LENGTH_TIME in equation (1) can be omitted.

A difference between the TSF value of the access point and the TSF value of the station may be calculated as:

$$TSF\_DELTA = TSF\_START\_LOCAL - TSF\_AP \quad (2)$$

A local Target Beacon Transmit Time ("TBTT_Beacon_LOCAL"), e.g., a time point to receive the current Beacon without the synchronization with the AP with the consideration of the hardware processing time, may be calculated as:

$$TBTT\_Beacon\_LOCAL = \quad (3)$$
$$TSF\_START\_LOCAL - MACHD\_LENGTH\_TIME$$

where MACHD_LENGTH_TIME equals the length of MAC header 508 divided by Beacon transmission rate. For example, the Beacon transmission rate is 1 Mbps and the length of MAC header 508 is 24 bytes (e.g., without the HT control field). The MACHD_LENGTH_TIME is 192 μs (24*8/1,000,000).

A Target Beacon Transmit Time ("TBTT_Beacon") for the next Beacon signal may be calculated as:

$$TBTT\_Beacon = \quad (4)$$
$$TBTT\_Beacon\_LOCAL + TSF\_DELTA + Beacon\ Interval$$

where Beacon Interval is a preset value indicating how often the Beacon signals are transmitted by the AP. For example, the Beacon Interval may be 100 TUs or about 102.4 ms.

It should be noted that equation (4) is based on an assumption that the Beacon signal is broadcasted at the TBTT with no transmission time or delay over the air interface. If the Beacon signal is not broadcasted at the TBTT or delay over air interface is considered, the equation (4) should be updated accordingly. For example, if the Beacon signal is not broadcasted at the TBTTs (e.g., due to delays), the TBTT_Beacon may be calculated as:

$$TBTT\_Beacon = \lfloor (TSF\_AP / Beacon\ Interval) \rfloor * Beacon\ Interval + \quad (5)$$
$$TSF\_DELTA + Beacon\ Interval$$

where $\lfloor \ \rfloor$ is an operator that rounds the number inside down to the nearest integer.

It should be noted that although the present disclosure address offset caused by hardware processing time, offset caused by other reasons such as air transmission time, network traffic, propagation delays, clock drift, can also be addressed by a method same as or similar to the present method. Such application or modification is also protected by the present disclosure.

Figure 6:
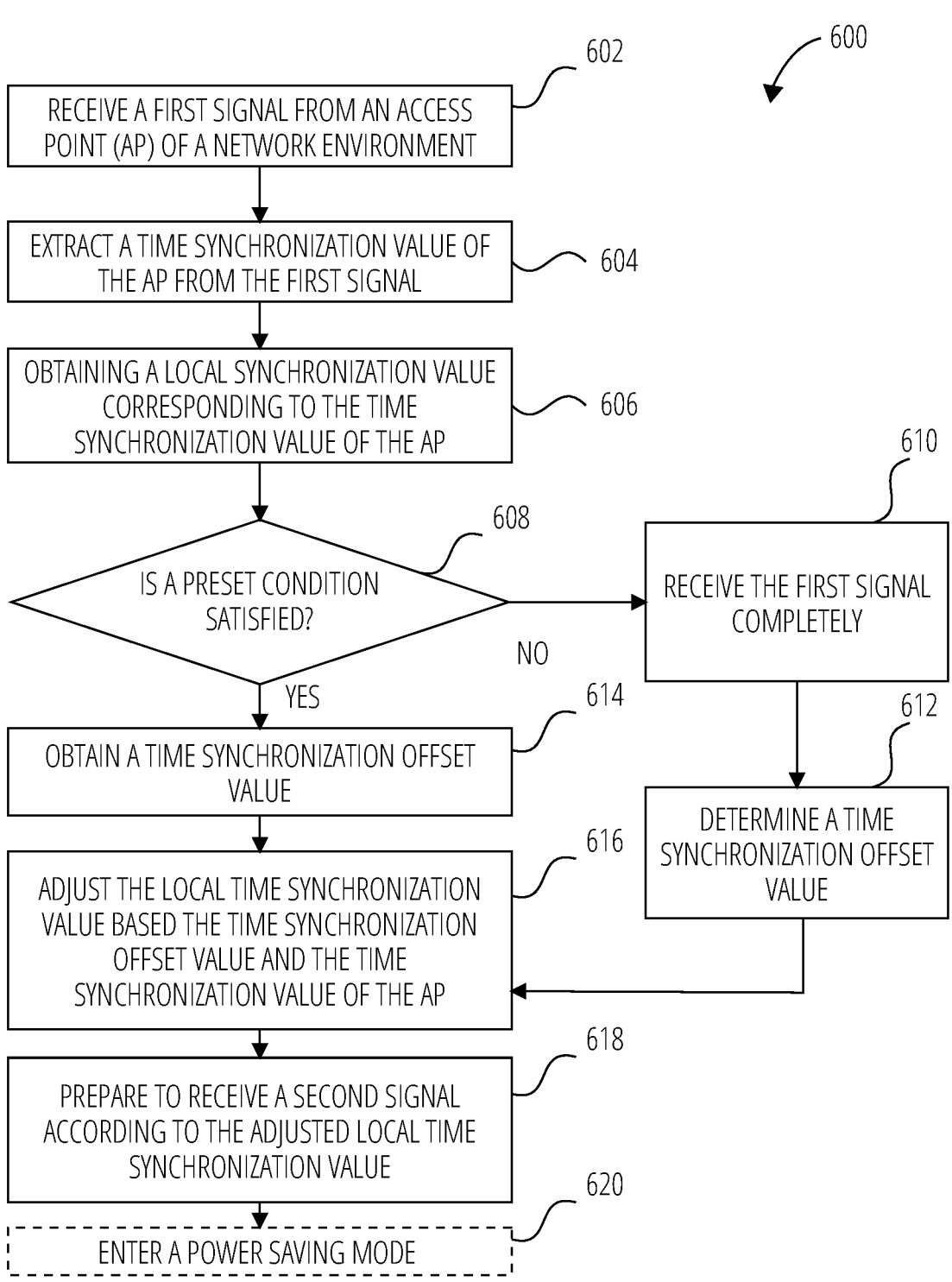
FIG. 6 is a flowchart illustrating operations of the IoT device in preparing to receive a second signal, in accordance with some example embodiments.

FIG. 6 is a flowchart illustrating operations of the IoT device in preparing to receive a second signal, in accordance with some example embodiments. The method 600 may be embodied in computer-readable instructions for execution by one or more processors such that operations of the method 600 may be performed in part or in whole by the functional components of the IoT device 110 (or IoT device 112); accordingly, the method 600 is described below by way of example with reference thereto. However, it shall be appreciated that at least some of the operations of the method 600 may be deployed on various other hardware configurations than the IoT device 110. Also, the operations of the method 600 may be partially omitted, or performed in any order.

In operation 602, the IoT device 110 may receive a first signal from an access point (AP) of a network environment. The first signal may be a Beacon signal. The network environment may be a Wi-Fi network under an IEEE 802.11 standard. Alternatively, or additionally, the network environment may be a Bluetooth, a ZigBee, a Z-Wave, a LPWAN, a RFID, a NFC, etc.

In operation 604, the IoT device 110 may extract a time synchronization value of the AP from the first signal. In some examples, the time synchronization value of the AP is an 8-byte TSF value immediately following the MAC header. Specifically, when a MAC RX analyzer (e.g., MAC RX analyzer 204) identifies that the first signal is a Beacon signal (e.g., by checking the frame control field of the MAC header), it begins to write the part which corresponds to the TSF value of the AP onto a RX buffer (e.g., RX buffer 206).

In operation 606, the IoT device 110 may obtain a local synchronization value corresponding to the time synchronization value of the AP. In some examples, the IoT device 110 may read the counting on a TSF local counter (e.g., TSF local counter 216). It should be noted that operation 606 and operation 604 may be performed simultaneously or in any order. For example, the local synchronization value is obtained either immediately before or immediately after the time synchronization value of the AP is extracted from the first signal.

In operation 608, the IoT device 110 may determine whether a preset condition is satisfied. The preset condition may indicate that the receiving of the first signal is to be interrupted. Merely by way of examples, the preset condition includes a determination that no data packet is to be received (see, e.g., FIG. 4B) and/or a determination that another signal is to preempt the communication of the first signal (see, e.g., FIG. 4C).

Taking the determination that no data packet is to be received as an example preset condition, the IoT device 110 may determine whether the data field of Beacon signal indicates that no data packet is buffered at the AP for the IoT device. Specifically, the first signal includes a TIM element. The TIM element includes a bitmap control field and a partial virtual bitmap field. The Bitmap control field contains a TBM bit (i.e., first bit) that indicates whether a data packet (i.e., a broadcast data packet or a multicast data packet) is buffered at the access point. If the TBM bit is set to 1, it is indicated that the AP has buffered data packet. If the TBM bit is set to 0, the partial virtual bitmap field (and the remaining 7 bits of the Bitmap control field) may be further checked to determine whether the AP has buffered data packet (i.e., a unicast data packet). Specifically, each station is assigned an Association ID (AID) by the access point. The Partial Virtual Bitmap field is a sequence of bits that represent whether associated stations have a data packet buffered at the access point. Each bit in the Partial Virtual Bitmap field corresponds to an AID of an associated station. If a bit is set to 1, it is indicated that the AP has buffered frames for the station with the corresponding AID. If a bit is set to 0, it is indicated that there is no data packet buffered at the AP for that station.

Taking the determination that a coexisting signal is to preempt the communication of a current signal as an example preset condition, the IoT device 110 may determine whether the coexisting signal has a higher priority degree than the current signal. Details regarding this scenario can be found in FIG. 4C and descriptions thereof.

In response to a determination that the preset condition is satisfied (e.g., when the TBM bit is 1 or the bit in the partial virtual bitmap field corresponding to the AID of the IoT device 110 is 1, when the priority degree of a coexisting signal is higher than that of the first signal), the method 600 may proceed to operation 614; otherwise, the method 600 may proceed to operation 610.

In operation 610, the IoT device 110 may receive the first signal completely.

In operation 612, the IoT device 110 may determine a time synchronization offset value corresponding to the first signal. The time synchronization offset value is measured as a difference between a real time point when the first signal is received and processed completely and a theoretical time point calculated without considering the signal processing time and air transmission time. The time synchronization offset value is determined when the first signal is received completely and uninterruptedly.

In operation 614, the IoT device 110 may obtain a time synchronization offset value. The time synchronization offset value is obtained based on an average signal processing time corresponding to at least one sample signal. Details regarding the determination of time synchronization offset value based on the signal processing time may be found in FIG. 7 and the descriptions thereof.

In operation 616, the IoT device 110 may adjust the local time synchronization value based on the time synchronization offset value and the time synchronization value of the AP. Details regarding the adjustment may be found in equations (1)-(2) and the descriptions thereof.

In operation 618, the IoT device 110 may prepare to receive a second signal according to the adjusted local time synchronization value. Details may be found in equations (3)-(4)/(5) and the descriptions thereof.

Optionally, in operation 620, the IoT device 110 may enter or reenter a power-saving mode.

FIG. 7 is a flowchart illustrating operations of the IoT device in determining a time synchronization offset value, in accordance with some example embodiments. The method 700 may be embodied in computer-readable instructions for execution by one or more processors such that operations of the method 700 may be performed in part or in whole by the functional components of the IoT device 110 (or IoT device 112); accordingly, the method 700 is described below by way of example with reference thereto. However, it shall be appreciated that at least some of the operations of the method 700 may be deployed on various other hardware configurations than the IoT device 110. Also, the operations of the method 700 may be partially omitted, or performed in any order.

In operation 702, the IoT device 110 may receive at least one sample signal from the AP. In some examples, each of the at least one signal is a Beacon signal that is fully processed. The at least one sample signal may be processed sequentially, collectively, or independently.

In operation 704, the IoT device 110 may determine at least one signal processing time, wherein each of the signal processing time corresponds to one of the at least one sample signal. Specifically, the signal processing time is determined as a difference between the time when the Beacon signal is completely received (e.g., when the last bit of the Beacon signal is received via the air interface) and the time when the Beacon signal is completely processed (e.g., when the last bit of Frame Check Sequence (FCS) of the Beacon signal is completely processed).

In operation 706, the IoT device 110 may determine the time synchronization offset value (e.g., HW_DELTA) based on the at least one signal processing time. For example, the time synchronization offset value is calculated by applying a filter on the at least one signal processing time when at least one sample signal is sequentially processed. The filter may include a moving average filter, an alpha filter, an alpha-beta filter, a Kalman Filter, a Median filter, a Wiener filter, an adaptive filter. Alternatively, the time synchronization offset value is an average number of the at least one signal processing time when the at least one sample signal is independently processed.

Optionally, in operation 708, the IoT device 110 may receive the second signal from the AP. Operation 708 may be a subsequent operation following the operations 618 and 620.

Optionally, in operation 710, the IoT device 110 may determine a signal processing time corresponding to the second signal.

Optionally, in operation 712, the IoT device 110 may update the time synchronization offset value based on the signal processing time corresponding to the second signal. For example, the IoT device 110 applies a same or different filter on the signal processing time corresponding to the second signal and the time synchronization offset value to generate the updated time synchronization offset value.

FIG. 8 is a flowchart illustrating operations of the IoT device in determining a target transmit time, in accordance with some example embodiments. The method 800 may be embodied in computer-readable instructions for execution by one or more processors such that operations of the method 800 may be performed in part or in whole by the functional components of the IoT device 110 (or IoT device 112); accordingly, the method 800 is described below by way of example with reference thereto. However, it shall be appreciated that at least some of the operations of the method 800 may be deployed on various other hardware configurations than the IoT device 110. Also, the operations of the method 800 may be partially omitted, or performed in any order.

In operation 802, the IoT device 110 may determine a time synchronization offset value, HW_DELTA. Details regarding the determination of HW_DELTA may be found in FIG. 7 and descriptions thereof.

In operation 804, the IoT device 110 may determine a local time synchronization value of the AP, TSF_AP_LOCAL. The TSF_AP_LOCAL may be read from a TSF local counter (e.g., TSF local counter 216).

In operation 806, the IoT device 110 may obtain a data transmission speed of the first signal. The data transmission speed can be obtained by a PHY layer (e.g., PHY 202). For example, the data transmission speed is 1 Mbps.

In operation 808, the IoT device 110 determine a data transmission time of the time synchronization value (TSF value) of the AP, TSF_LENGTH_TIME, based on a data length of the time synchronization value and the data transmission speed of the first signal. In some examples, the length of the time synchronization value (TSF value) of the AP is 8 bytes and the TSF_LENGTH_TIME is 64 μs (8*8/1,000,000). In cases where the local TSF value is obtained immediately before the TSF value in the Beacon signal is read, operation 808 can be omitted.

In operation 810, the IoT device 110 determine a start time of a local time synchronization value, TSF_START_LO- CAL, based on the data transmission time, the time synchronization offset value, and the local time synchronization value of the AP. Details of the determination of TSF_START_LOCAL may be found in equation (1) and descriptions thereof. In cases where the local TSF value is obtained immediately before the TSF value in the Beacon signal is read, the TSF_LENGTH_TIME can be omitted from equation (1).

In operation 812, the IoT device 110 determine a data transmission time of a header, MACHD_LENGTH_TIME, based on a data length of the header and the data transmission speed of the first signal. For example, the data transmission rate is 1 Mbps and the length of MAC header is 24 bytes (e.g., without the HT control field). The MACHD_LENGTH_TIME is 192 μs (24*8/1,000,000).

In operation 814, the IoT device 110 determine a first target transmit time, TBTT_BEACON_LOCAL, associated with the first signal, based on the start of the local time synchronization value and the data transmission time of the header. Details of the determination of TBTT_BEACON_LOCAL may be found in equation (3).

In operation 816, the IoT device 110 determine/calculate a second target transmit time, TBTT_BEACON, based on the first target transmit time, start time of local time synchronization value, the time synchronization value (TSF value) of the AP, and a beacon interval. Details of the determination of TBTT_BEACON may be found in equation (4).

If the delay over the air interface is considered, i.e., the Beacon signal is not broadcasted at the TBTT, the TBTT_BEACON may be calculated based on TSF_AP, Beacon Interval, and TSF_DELTA. Details of the calculation may be found in equation (5).

In operation 818, the IoT device 110 prepare to receive the second signal at the second target transmit time.

To be clear, the IoT device 110 employs the method 800 to prepare itself to receive the second signal at the determined/calculated second target transmit time (or target receive time if delay is considered), rather than controlling the AP to broadcast the second signal at the second target transmit time.

Examples

1. A method comprising:
   receiving a first signal from an access point (AP) of a network environment;
   extracting a time synchronization value of the AP from the first signal;
   obtaining a local time synchronization value corresponding to the time synchronization value of the AP;
   determining whether a preset condition is satisfied, the preset condition indicating that the receiving of the first signal is to be interrupted; and
   in response to a determination that the preset condition is satisfied,
      obtaining a time synchronization offset value;
      adjusting the local time synchronization value based on the time synchronization offset value and the time synchronization value of the AP; and
      preparing to receive a second signal according to the adjusted local time synchronization value.
2. The method of example 1, wherein the preset condition comprises:
   a determination that no data packet is to be received.
3. The method of example 2, wherein the determination that no data packet is to be received comprises:

identifying a traffic indication map (TIM) element from the first signal;
   extracting a bitmap control value and a partial virtual bitmap value from the TIM element; and
   determining that no data packet is to be received based on the bitmap control value and the partial virtual bitmap value.
4. The method of example 1, wherein the preset condition comprises:
   a determination that a third signal is to preempt a communication of the first signal.
5. The method of any one of examples 1-4, wherein the time synchronization offset value is generated by operations comprising:
   receiving at least one sample signal from the AP;
   determining at least one signal processing time, each of the signal processing time corresponding to one of the at least one sample signal; and
   determining the time synchronization offset value based on the at least one signal processing time.
6. The method of example 5, further comprising:
   receiving the second signal from the AP;
   determining a signal processing time corresponding to the second signal; and
   updating the time synchronization offset value based on the signal processing time corresponding to the second signal.
7. The method of any one of examples 5-6, wherein the at least one sample signal is completely received.
8. The method of any one of examples 1-7, further comprising:
   in response to the determination that the preset condition is satisfied, skipping remaining data in the first signal.
9. The method of any one of examples 1-8, further comprising:
   in response to a determination that the preset condition is not satisfied,
      receiving the first signal completely;
      determining the time synchronization offset value;
      adjusting the local time synchronization value based on the time synchronization value of the AP and the time synchronization offset value; and
      preparing to receive the second signal according to the local time synchronization value and the time synchronization value of the AP.
10. The method of any one of examples 1-9, wherein the preparing to receive the second signal according to the adjusted local time synchronization value comprises:
   determining a data length of a header in the first signal;
   obtaining a data transmission speed of the first signal;
   determining a first target transmit time associated with the first signal based on the data transmission speed of the first signal, the adjusted local time synchronization value, and the data length of the header in the first signal;
   determining a second target transmit time based on the first target transmit time, the adjusted local time synchronization value and the time synchronization value of the AP; and
   preparing to receive the second signal at the second target transmit time.
11. An Internet of Things (IoT) device comprising:
   a processor; and
   a memory storing instructions that, when executed by the processor, configure the IoT device to:
      receive a first signal from an access point (AP) of a network environment;

US 12,581,444 B2

15 extract a time synchronization value of the AP from the first signal;
obtain a local time synchronization value corresponding to the time synchronization value of the AP;
determine whether a preset condition is satisfied, the preset condition indicating that the receiving of the first signal is to be interrupted; and
in response to a determination that the preset condition is satisfied,
obtain a time synchronization offset value;
adjust the local time synchronization value based on the time synchronization offset value and the time synchronization value of the AP; and
prepare to receive a second signal according to the adjusted local time synchronization value.

12. The IoT device of example 11, wherein the preset condition comprises:
a determination that no data packet is to be received.

13. The IoT device of example 12, wherein to determine that no data packet is to be received comprises, the instructions further configure the IoT device to:
identify a traffic indication map (TIM) element from the first signal;
extract a bitmap control value and a partial virtual bitmap value from the TIM element; and
determine that no data packet is to be received based on the bitmap control value and the partial virtual bitmap value.

14. The IoT device of example 11, wherein the preset condition comprises:
a determination that a third signal is to preempt a communication of the first signal.

15. The IoT device of any one of examples 11-14, wherein the time synchronization offset value is generated by operations comprising:
receiving at least one sample signal from the AP;
determining at least one signal processing time, each of the signal processing time corresponding to one of the at least one sample signal; and
determining the time synchronization offset value based on the at least one signal processing time.

16. The IoT device of example 15, wherein the instructions further configure the IoT device to:
receive the second signal from the AP;
determine a signal processing time corresponding to the second signal; and
update the time synchronization offset value based on the signal processing time corresponding to the second signal.

17. The IoT device of any one of examples 15-16, wherein the at least one sample signal is completely received.

18. The IoT device of any one of examples 11-17, wherein the instructions further configure the IoT device to:
in response to the determination that the preset condition is satisfied, skip remaining data in the first signal.

19. The IoT device of any one of examples 11-18, wherein to prepare to receive the second signal according to the adjusted local time synchronization value, the instructions further configure the IoT device to:
determine a data length of a header in the first signal;
obtain a data transmission speed of the first signal;
determine a target transmit time associated with the first signal based on the data transmission speed of the first signal, the adjusted local time synchronization value, and the data length of the header in the first signal;

determine a second target transmit time based on the first target transmit time, the adjusted local time synchronization value and the time synchronization value of the AP; and
prepare to receive the second signal at the second target transmit time.

20. A non-transitory computer-readable storage medium, the computer-readable storage medium including instructions that when executed by a computer, cause the computer to:
receive a first signal from an access point (AP) of a network environment;
extract a time synchronization value of the AP from the first signal;
obtain a local time synchronization value corresponding to the time synchronization value of the AP;
determine whether a preset condition is satisfied, the preset condition indicating that the receiving of the first signal is to be interrupted; and
in response to a determination that the preset condition is satisfied,
obtain a time synchronization offset value;
adjust the local time synchronization value based on the time synchronization offset value and the time synchronization value of the AP; and
prepare to receive a second signal according to the adjusted local time synchronization value.

CONCLUSION

The present disclosure provides system and methods for predetermining an average hardware processing time at the instances when the whole Beacon signal is processed. The average hardware processing time is then used to calibrate the local TSF value when only part of the Beacon signal is processed. A Target Beacon Transmit Time (TBTT) can also be calculated based on the calibrated local TSF value and the IoT device can be prepared to receive the next Beacon signal based on the TBTT. The present disclosure potentially has at least the following advantages: 1. By processing only part of the Beacon signal, the power consumption of the IoT device can be reduced. 2. While receiving the Beacon signal, the IoT device can switch to a communication with a higher priority without losing the time synchronization with the AP.

What is claimed is:
1. A method comprising:
receiving a first signal from an access point (AP) of a network environment;
extracting a time synchronization value of the AP from the first signal;
obtaining a local time synchronization value corresponding to the time synchronization value of the AP;
determining whether a preset condition is satisfied, the preset condition indicating that the receiving of the first signal is to be interrupted; and
in response to a determination that the preset condition is satisfied,
obtaining a time synchronization offset value;
adjusting the local time synchronization value based on the time synchronization offset value and the time synchronization value of the AP; and
preparing to receive a second signal according to the adjusted local time synchronization value,
wherein the preset condition comprises a determination that no data packet is to be received.

2. The method of claim 1, wherein the determination that no data packet is to be received comprises:

identifying a traffic indication map (TIM) element from the first signal;

extracting a bitmap control field value and a partial virtual bitmap value from the TIM element; and determining that no data packet is to be received based on the bitmap control field value and the partial virtual bitmap value.

3. The method of claim 1, wherein the preset condition comprises:

a determination that a third signal is to preempt a communication of the first signal.

4. The method of claim 1, wherein the time synchronization offset value is generated by operations comprising:

receiving at least one sample signal from the AP;

determining at least one signal processing time, each of the signal processing time corresponding to one of the at least one sample signal; and determining the time synchronization offset value based on the at least one signal processing time.

5. The method of claim 4, further comprising:

receiving the second signal from the AP;

determining a signal processing time corresponding to the second signal; and updating the time synchronization offset value based on the signal processing time corresponding to the second signal.

6. The method of claim 4, wherein the at least one sample signal is completely received.

7. The method of claim 1, further comprising:

in response to the determination that the preset condition is satisfied, skipping remaining data in the first signal.

8. The method of claim 1, further comprising:

in response to a determination that the preset condition is not satisfied, receiving the first signal completely;

determining the time synchronization offset value;

adjusting the local time synchronization value based on the time synchronization value of the AP and the time synchronization offset value; and preparing to receive the second signal according to the local time synchronization value and the time synchronization value of the AP.

9. The method of claim 1, wherein the preparing to receive the second signal according to the adjusted local time synchronization value comprises:

determining a data length of a header in the first signal;

obtaining a data transmission speed of the first signal;

determining a first target transmit time associated with the first signal based on the data transmission speed of the first signal, the adjusted local time synchronization value, and the data length of the header in the first signal;

determining a second target transmit time based on the first target transmit time, the adjusted local time synchronization value and the time synchronization value of the AP; and preparing to receive the second signal at the second target transmit time.

10. An Internet of Things (IoT) device comprising:

a processor; and a memory storing instructions that, when executed by the processor, configure the IoT device to:

receive a first signal from an access point (AP) of a network environment;

extract a time synchronization value of the AP from the first signal;

obtain a local time synchronization value corresponding to the time synchronization value of the AP;

determine whether a preset condition is satisfied, the preset condition indicating that the receiving of the first signal is to be interrupted; and in response to a determination that the preset condition is satisfied, obtain a time synchronization offset value;

adjust the local time synchronization value based on the time synchronization offset value and the time synchronization value of the AP; and prepare to receive a second signal according to the adjusted local time synchronization value, wherein the preset condition comprises a determination that a third signal is to preempt a communication of the first signal.

11. The IoT device of claim 10, wherein the preset condition comprises:

a determination that no data packet is to be received.

12. The IoT device of claim 11, wherein to determine that no data packet is to be received comprises, the instructions further configure the IoT device to:

identify a traffic indication map (TIM) element from the first signal;

extract a bitmap control field value and a partial virtual bitmap value from the TIM element; and determine that no data packet is to be received based on the bitmap control field value and the partial virtual bitmap value.

13. The IoT device of claim 10, wherein the time synchronization offset value is generated by operations comprising:

receiving at least one sample signal from the AP;

determining at least one signal processing time, each of the signal processing time corresponding to one of the at least one sample signal; and determining the time synchronization offset value based on the at least one signal processing time.

14. The IoT device of claim 13, wherein the instructions further configure the IoT device to:

receive the second signal from the AP;

determine a signal processing time corresponding to the second signal; and update the time synchronization offset value based on the signal processing time corresponding to the second signal.

15. The IoT device of claim 13, wherein the at least one sample signal is completely received.

16. The IoT device of claim 10, wherein the instructions further configure the IoT device to:

in response to the determination that the preset condition is satisfied, skip remaining data in the first signal.

17. The IoT device of claim 10, wherein to prepare to receive the second signal according to the adjusted local time synchronization value, the instructions further configure the IoT device to:

determine a data length of a header in the first signal;

obtain a data transmission speed of the first signal;

determine a target transmit time associated with the first signal based on the data transmission speed of the first signal, the adjusted local time synchronization value, and the data length of the header in the first signal;

determine a second target transmit time based on the first target transmit time, the adjusted local time synchronization value and the time synchronization value of the AP; and prepare to receive the second signal at the second target transmit time.

18. A non-transitory computer-readable storage medium, the computer-readable storage medium including instructions that when executed by a computer, cause the computer to:

receive a first signal from an access point (AP) of a network environment;

extract a time synchronization value of the AP from the first signal;

obtain a local time synchronization value corresponding to the time synchronization value of the AP;

determine whether a preset condition is satisfied, the preset condition indicating that the receiving of the first signal is to be interrupted; and in response to a determination that the preset condition is satisfied, obtain a time synchronization offset value;

adjust the local time synchronization value based on the time synchronization offset value and the time synchronization value of the AP;

skip remaining data in the first signal; and prepare to receive a second signal according to the adjusted local time synchronization value.

* * * * *